US012482996B2

(12) United States Patent
Porebski et al.

(10) Patent No.: US 12,482,996 B2
(45) Date of Patent: Nov. 25, 2025

(54) ELECTRICAL PLUG CONNECTOR FOR A BUSBAR

(71) Applicant: Aptiv Technologies AG, Schaffhausen (CH)

(72) Inventors: Grzegorz Porebski, Podleze (PL); Jakub Walkowski, Rzezawa (PL); Paulina Budny, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 332 days.

(21) Appl. No.: 17/960,409

(22) Filed: Oct. 5, 2022

(65) Prior Publication Data

US 2023/0120886 A1 Apr. 20, 2023

(30) Foreign Application Priority Data

Oct. 15, 2021 (EP) .................................... 21202921

(51) Int. Cl.
*H01R 25/16* (2006.01)
*H01R 13/52* (2006.01)
(Continued)

(52) U.S. Cl.
CPC ......... *H01R 25/165* (2013.01); *H01R 13/521* (2013.01); *H01R 13/6273* (2013.01); *H01R 13/62933* (2013.01); *H01R 2201/26* (2013.01)

(58) Field of Classification Search
CPC .............. H01R 13/521; H01R 13/6273; H01R 13/62933; H01R 13/42; H01R 13/40; H01R 23/7073; H01R 25/165; H01R 2201/26
(Continued)

(56) References Cited

U.S. PATENT DOCUMENTS 5,447,452 A * 9/1995 Takano ................ H01R 13/506 439/695
6,955,570 B2 10/2005 Mills et al.
(Continued)

FOREIGN PATENT DOCUMENTS

CN 201629472 U 11/2010
CN 203774516 U 8/2014
(Continued)

OTHER PUBLICATIONS

European Partial Search Report for Application No. 21202921.9, Dated Mar. 28, 2022, 12 pages.
(Continued)

*Primary Examiner* — Gary F Paumen
(74) *Attorney, Agent, or Firm* — Billion & Armitage

(57) ABSTRACT

The present invention relates to an electrical plug connector for an electrical connection system. The electrical plug connector comprises a plug connector housing comprising a housing body and a busbar portion. The busbar portion is at least partially accommodated in the plug connector housing. The busbar portion includes a busbar conductor, and a busbar end which is integrally formed with the busbar conductor. The busbar end includes a connection portion that is configured for being plugged to a mating connector to establish an electrical connection. The busbar end further includes a retention means which is configured to engage with a corresponding retention means to receive pull forces being imposed on the busbar portion in a direction opposite to a mating direction. The plug connector housing has a corresponding retention means that engages with the retention means when the busbar portion is at least partially accommodated in the plug connector housing.

17 Claims, 7 Drawing Sheets

(51) Int. Cl.
*H01R 13/627* (2006.01)
*H01R 13/629* (2006.01)

(58) Field of Classification Search
USPC ....................... 439/733.1, 752, 587, 696, 372
See application file for complete search history.

(56) References Cited

U.S. PATENT DOCUMENTS

| | | | | |
|---|---|---|---|---|
| 7,581,972 | B2 | 9/2009 | Daamen | |
| 8,313,352 | B2 * | 11/2012 | Yu | H01H 1/58 439/733.1 |
| 8,702,454 | B2 * | 4/2014 | Hamada | H01R 13/41 439/733.1 |
| 9,337,597 | B2 | 5/2016 | Daamen et al. | |
| 2010/0178787 | A1 * | 7/2010 | Lux | H01R 13/4534 439/271 |
| 2010/0279556 | A1 * | 11/2010 | Zweigle | H01R 13/41 439/733.1 |
| 2011/0014822 | A1 * | 1/2011 | Kato | H01R 13/65912 439/733.1 |
| 2011/0212654 | A1 * | 9/2011 | Suzuki | H01R 13/113 439/733.1 |
| 2014/0287631 | A1 * | 9/2014 | Tashiro | H01R 13/5216 439/733.1 |
| 2016/0254618 | A1 * | 9/2016 | Ludwig | H01R 13/62955 439/372 |
| 2019/0104634 | A1 | 4/2019 | Hasija et al. | |
| 2022/0052466 | A1 | 2/2022 | Kobayashi et al. | |

FOREIGN PATENT DOCUMENTS

| | | | |
|---|---|---|---|
| CN | 109599728 | A | 4/2019 |
| CN | 210167554 | U | 3/2020 |
| CN | 113454852 | A | 9/2021 |
| JP | 2013214405 | A | 10/2013 |
| JP | 2020043001 | A | 3/2020 |
| WO | 2015145281 | A1 | 10/2015 |
| WO | 2020121834 | A1 | 6/2020 |

OTHER PUBLICATIONS

"Communication pursuant to Art. 94(3) EPC"; European Patent Office; mailed on Mar. 25, 2025; 5 Pages.
"Chinese Office Action" for CN Application No. 202211171878.2 (with Machine Translation); Chinese National Intellectual Property Authority; mailed Jun. 25, 2025 19 pages.
"Machine Translation of CN210167554U", 15 Pages.
"Machine Translation of JP2020043001A", 23 Pages.

* cited by examiner

ELECTRICAL PLUG CONNECTOR FOR A BUSBAR

CROSS-REFERENCE TO RELATED APPLICATION

This application claims benefit of priority to European Patent Application No. 21202921.9 filed on Oct. 15, 2021, the entire disclosure of which is hereby incorporated by reference.

TECHNICAL FIELD OF THE INVENTION

The present disclosure relates to an electrical plug connector, a mating connector, a system including a first electrical plug connector and a second electrical plug connector, an electrical connection system including the electrical plug connector and the mating connector, a method for assembling a busbar, a busbar, and a wiring harness. Particularly, the present disclosure relates to the field of busbars of an electrical vehicle.

BACKGROUND

In modern vehicles, the transmission of electric power and signals is becoming increasingly important. This particularly applies to electric vehicles, whose functionality is highly based on a stable energy supply from a charging inlet to a battery and from the battery to one or more electric devices, such as electric motors.

To transmit electric power and signals, a wiring harness is usually utilized in the automotive industry. A wiring harness, also known as a cable harness, is an assembly of electric conductors such as busbars, cables and/or wires. Thereby wiring harnesses provide several advantages over loose conductors. The wiring harnesses are prefabricated and then mounted into a vehicle and connected to respective electric interfaces.

In hybrid and electric vehicles high electric currents and high voltages are often transmitted by means of busbars. The busbars may form part of the wiring harness and/or of the further electric architecture of the vehicle which may be connected to the wiring harness. Exemplarily, busbars may be directly attached to the battery of the vehicle as an interface for further electric connections. Moreover, a busbar provided in the wiring harness may serve to conduct electric power from a battery of the vehicle to an electric motor of the vehicle and/or from a charging port to the battery.

For electric vehicles, it is crucial that a busbar, which for example is supposed to provide energy from the battery to the vehicle, is connected to a respective conductor safely and with as little electric resistance as possible. Existing solutions for the connection of busbars with further conductors include welded, screwed and/or bolted connections. These types of connections are robust since they withstand high/low temperatures, humidity, and vibrations. However, such types of connections require many steps and complex processes to integrate them into electric architectures. Exemplarily, it is complicated to weld a connection between a busbar and a cable in the wiring harness while the vehicle is on the production line. Same applies for screwed and/or bolted connections. Further the welded, screwed and/or bolted connections also increase the electric resistance. Moreover, most of the existing solutions are one-time use, which leads to difficulties in system integration and requires special processes for harness manufacturing and final assembly in electric vehicles.

Thus, it is an object of the present disclosure to provide an electrical plug connector, a mating connector, a system including a first electrical plug connector and a second electrical plug connector, an electrical connection system including the electrical plug connector and the mating connector, a method for assembling a busbar, a busbar, and a wiring harness that at least partially overcome the aforementioned drawbacks.

SUMMARY

These objects are achieved, at least partly, by an electrical plug connector (plug connector), a mating connector, a system including a first electrical plug connector and a second electrical plug connector, an electrical connection system including the electrical plug connector and the mating connector, a method for assembling a busbar, a busbar, and a wiring harness, as defined in the independent claims. Further aspects of the present disclosure are defined in the dependent claims.

In particular, the object is achieved by an electrical plug connector for an electrical connection system. The electrical plug connector and accordingly the electrical connection system may be suited for a busbar of an electrical vehicle.

The electrical plug connector includes a plug connector housing including a housing body, and a busbar portion. The busbar portion is at least partially accommodated in the plug connector housing. The busbar portion includes a busbar conductor, and a busbar end which is integrally formed with the busbar conductor. The busbar end includes a connection portion, the connection portion being configured for being plugged to a mating connector to establish an electrical connection. The busbar end further includes a retention means, which is configured to engage with a corresponding retention means to receive pull forces being imposed on the busbar portion in a direction opposite to a mating direction. The plug connector housing includes a corresponding retention means, that engages with the retention means, when the busbar portion is at least partially accommodated in the plug connector housing.

The plug connector housing may be a female housing that is adapted to, at least partially, receive a housing of a male mating connector. Alternatively, the plug connector housing is a male housing that is adapted to, at least partially, be received in a housing of a female mating connector.

The housing body may include a bent sheet metal and/or a plastic, particularly a reinforced plastic. Further, the housing body may be manufactured by casting or injection molding. The housing body may define an inner volume. Further, the busbar portion may be at least partially accommodated in the housing body. Thus, the housing body may electromagnetically shield the busbar portion and/or the surrounding area of the plug connector. Moreover, the corresponding retention means may be provided at the housing body. Preferably, the corresponding retention means is provided at a surface of the inner volume of the housing body.

The busbar portion may be adapted for signal and/or power transmission. With the busbar end being integrally formed with the busbar conductor the electric resistance can be reduced. The term "integrally formed" means that a conducting material of the busbar conductor continuously transitions to the busbar end. Thus, no material boundary exists. Hence, the busbar end may not be differentiated from the busbar conductor.

The busbar end is used as an electrical terminal in the plug connector, i.e., the connection portion of the busbar end is configured to be directly mated into the mating connector by means of the electrical plug connector. Hence, there is no need to screw, weld or otherwise fasten the busbar to a respective terminal and/or substrate. This allows to reduce the number of parts as well as the electrical resistance and further allows for a more reliable electrical connection.

The busbar conductor may be rigid and/or flexible. Moreover, the busbar conductor may be at least partially surrounded by an isolation. Thereby, the isolation is preferably removed or removable from the busbar end.

The retention means may be further configured such that when being engaged with a corresponding retention means the retention means may be disengaged, if need be. This allows disassembling, exchanging or maintenance of the busbar and/or a respective cable harness. Further, the retention means may be configured such that engaging with the corresponding retention means may be conducted by plugging. Even further, the retention means may be configured such that disengaging from the corresponding retention means may be conducted by unplugging. Further, the retention means may be configured such that engaging with the corresponding retention means may be conducted by a snap fit connection.

Preferably, the retention means is configured such that no additional fastening means is necessary for keeping the connection portion safely fixed in the plug connector housing and accordingly plugged to the mating connector. Particularly preferred, the retention means is configured such that no screwing, welding, gluing and/or bolting is necessary for keeping the connection portion safely fixed in the plug connector housing and accordingly plugged to the mating connector. Thus, the electrical plug connector allows improved and/or more flexible connections with the mating connector.

By plugging the connection portion of the busbar end directly into the mating connector by means of the electrical plug connector, the number of connection parts may be reduced. Further, the electric resistance may be reduced.

The busbar conductor may include a conductor material. The conductor material may include at least one of the following: copper, aluminum, a copper based alloy and/or an aluminum based alloy. Further, the conductor material may include brass.

The busbar end may include a coated area in which a coating material is applied. The coating material may be selected from the group of tin, nickel, silver, gold, a tin based alloy and/or a nickel based alloy. The coating may be applied directly on the busbar conductor. Alternatively, there may be additional conducting layer(s), such as a plating, between the busbar conductor and the coating material. The coating material may be applied on the busbar end, only. The coating may be applied by chemical vapor deposition, physical vapor deposition, spraying, thermal spraying, dipping and/or electroplating. The coating material may serve to prevent oxidation of the conductor material. Further, the coating material may improve the electrical conductivity properties.

The busbar end may further include a plated area, in which a plating material is plated on the busbar conductor. The plated area preferably at least partially corresponds to the connection portion. Further preferably the plating material includes at least one of the following: tin, nickel, silver, gold, a tin based alloy and/or a nickel based alloy. The plating material being plated on the busbar conductor is preferably in direct contact with the conductor material. The plating material may serve to prevent oxidation of the conductor material. Further, the plating material may improve the electrical conductivity properties.

Plating may be referred to as the process of applying one or more metal layers to another base metal on one or more sides. By means of plating it is preferred to create a bond that is as insoluble as possible. The bond may be achieved by pressure and/or temperature and/or subsequent heat treatment. Particularly, plating may be conducted by roll weld plating, rolling on thin metal foils, welding on, casting on, dipping, explosive plating or by galvano-technical processes, e.g., electroplating.

The plating may be applied directly on the busbar conductor. Alternatively, there may be additional conducting layer(s) between the busbar conductor and the plating material. The plating material may be at least partially sandwiched between the busbar conductor and the coating material. The coating material may serve to protect the plating material. Further, the coating material may increase the conductivity of the plating material. Even further, the coating material may change the surface properties of the plating material so that the friction and/or the adhesion of the connection portion is increased. A more reliable connection between the plug connector and the mating connector may be achieved.

Optionally, a subarea of the plated area is coated. Thus, the coated area may lie within the plated area. This may improve the conductive properties of the plated area locally. Further the friction and/or the adhesion of the connection portion may be increased locally. Further optionally, the coated area may expand beyond the plated area. Thus, the transition between the plated area and the underlying conductor material may be softened. Even further optionally, the coated area and the plated area may correspond to each other. Generally, the coating material may be applied to the plating material before the plating material is plated onto the conductor material. Thus, efficiency in manufacturing may be increased.

The busbar end may be at least partially surrounded by an electrical conducting sleeve. The sleeve may have better conductive properties than the conductor material. Further, the sleeve may be harder than the conductor material. Thus, wear and/or abrasion may be decreased, particularly for high vibrations. The sleeve may be crimped and/or shrunk on the busbar end. Moreover, the sleeve may be plated onto the busbar end. The sleeve may be adapted to fit into the mating connector. Further, the sleeve may include a conductive material. The conductive material may include at least one of the following: tin, nickel, silver, gold, a tin based alloy and/or a nickel based alloy.

The connection portion may include a tip portion. An edge of the tip portion is optionally chamfered. The edge is preferably chamfered such that the tip portion has a tapered shape. Further preferably, each edge of the tip portion which is perpendicular to the mating direction is chamfered. The chamfered edge may serve that the connection portion of the busbar end may be easily plugged to the mating connector. Further, the chamfered edge and preferably the tapered shape may allow that the connection portion of the busbar end may be easily inserted into the mating connector.

The busbar end and/or the busbar conductor may include a rectangular cross section. The rectangular cross section preferably has a width from 15 mm to 45 mm, more preferably from 22 mm to 28 mm, even more preferably from 23 mm to 27 mm, and most preferably from 24 mm to 26 mm. The rectangular cross section preferably has a height from 2 mm to 7 mm, more preferably from 3 mm to 6 mm, even more preferably from 4 mm to 5.5 mm, and most preferably from 4.5 mm to 5 mm. Further, the busbar portion may have a rectangular cross section. Even further, the busbar may have a rectangular cross section.

The busbar end and/or the busbar conductor may include an annular cross section. The annular cross section preferably has a diameter from 10 mm to 16 mm, more preferably from 11 mm to 15 mm, even more preferably from 12 mm to 14 mm, and most preferably from 12 mm to 13 mm. Further, at least the busbar portion may have an annular cross section. Even further, the busbar may have an annular cross section.

The cross section of the busbar may change. For example, the busbar end may have a cross section that differs from the cross section of the busbar conductor and/or of another busbar end. The cross section may change in shape and/or dimensions. For example, the busbar conductor may have a substantially rectangular cross section, while the busbar end has an annular cross section, or vice versa. Further, the busbar end and the busbar conductor may have a cross section of a similar shape (e.g., both rectangular or both annular), while the dimension of the cross section is different. For example, the busbar end may have a smaller cross-sectional area than the busbar conductor.

The busbar conductor may have the shape of a strip, a bar, a beam, a rod, a cylinder, a solid tube and/or a hollow tube.

A cross section of the busbar conductor may have a surface area from 80 $mm^2$ to 200 $mm^2$, preferably from 90 $mm^2$ to 190 $mm^2$, and even more preferably from 95 $mm^2$ to 180 $mm^2$.

For aluminum and/or an aluminum based alloy as conductor material the cross section of the busbar conductor preferably has a surface area from 100 $mm^2$ to 200 $mm^2$, preferably from 110 $mm^2$ to 190 $mm^2$, and even more preferably from 120 $mm^2$ to 180 $mm^2$. Thus, the cross section of the busbar conductor may be improved for the conductive properties of aluminum and/or an aluminum based alloy.

For copper and/or a copper based alloy as conductor material the cross section of the busbar conductor preferably has a surface area from 80 $mm^2$ to 180 $mm^2$, preferably from 90 $mm^2$ to 170 $mm^2$, and even more preferably from 95 $mm^2$ to 160 $mm^2$. Thus, the cross section of the busbar conductor may be improved for the conductive properties of copper and/or a copper based alloy.

The busbar portion may be configured for being used in a high-voltage track of an electrical vehicle. The busbar portion is preferably configured for guiding just one electrical phase. By guiding just one electrical phase, the busbar portion is more robust than if it would guide multiple phases. This is as a short circuit between the multiple phases due to vibrations, shocks, conductive particles and/or humidity is not possible.

The mating connector may be a high-voltage terminal, particularly for a busbar for powering electrical devices, such as an electrical engine of an electrical vehicle and/or for supplying power to and/or from the vehicle's battery. Hence, the mating connector and in particular the busbar portion may be configured for a voltage (permanent load) of at least 50 volts, preferably at least 100 volts, further preferably at least 200 volts and even further preferably at least 300 volts and most preferably at least 400 volts (permanent load). Further, mating connector and in particular the busbar portion may be configured for a voltage of at most at least 1500 volts, preferably at most 1200 volts, further preferably at most 1100 volts and even further preferably at most 1000 volts and most preferably at most 1000 V. Furthermore, mating connector and in particular the busbar portion may be configured for a voltage (permanent load) in the range of 50 volts to 1500 volts, preferably from 100 volts to 1200 volts, further preferably from 200 volts to 1100 volts, even further preferably from 300 volts to 1000 volts, and most preferably from 400 volts to 1000 volts.

Further, the mating connector and in particular the busbar portion may be configured for an amperage (permanent load) of at least 10 amps, preferably at least 20 amps, further preferably at least 50 amps, even further preferably at least 100 amps, and most preferably at least 300 amps. Moreover, the busbar portion may be configured for an amperage (permanent load) of at most 600 amps, preferably at most 550 amps, further preferably at most 500 amps, even further preferably at most 450 amps, and most preferably at most 400 amps. Furthermore, the mating connector and in particular the busbar portion may be configured for an amperage (permanent load) from 10 amps to 600 amps, preferably from 20 amps to 550 amps, further preferably from 50 amps to 500 amps, even further preferably from 100 amps to 450 amps, and most preferably from 300 amps to 400 amps. Further, the mating connector and in particular the busbar portion may be configured for a peak load that is at least 1.5 times the permanent load (voltage and/or amperage), optionally at least 2 times the permanent load (voltage and/or amperage) and further optionally at least 3 times the permanent load (voltage and/or amperage). Further, the mating connector and in particular the busbar portion may be configured for direct current (DC) and/or alternating current (AC).

The mating connector and in particular the busbar portion may be configured for the transmission of electrical power of at least 5 kilowatt, preferably at least 10 kilowatt further preferably at least 20 kilowatt and even further preferably at least 50 kilowatt and most preferably at least 100 kilowatt (permanent load). Further, the mating connector and in particular the busbar portion may be configured for the transmission of electrical power of at most at least 500 kilowatt, preferably at most 450 kilowatt, further preferably at most 400 kilowatt and even further preferably at most 350 kilowatt and most preferably at most 300 kilowatt (permanent load). Furthermore, the mating connector and in particular the busbar portion may be configured for the transmission of electrical power from 5 kilowatt to 500 kilowatt, preferably from 10 kilowatt to 450 kilowatt, further preferably from 20 kilowatt to 400 kilowatt, even further preferably from 50 kilowatt to 350 kilowatt, and most preferably from 100 kilowatt to 300 kilowatt (permanent load).

The plug connector housing may include a busbar retainer. The corresponding retention means is provided at the busbar retainer. The busbar retainer may be fixedly accommodated at the housing body. The busbar retainer optionally includes two parts. The two parts are further optionally connected by means of a snap connection. Further, the busbar retainer may retain the busbar portion within the housing body. Moreover, the busbar retainer may be attached to the busbar portion. Thereby the retention means may engage with the corresponding retention means. Preferably, the busbar retainer is accommodated inside the housing body.

When the busbar retainer includes two parts, one part preferably includes the corresponding retention means, whereas the other part is configured to fixedly attach the busbar retainer to the busbar portion.

The retention means may be a recess and/or a protrusion. Moreover, the retention means preferably encircles the busbar conductor. Further, the retention means is preferably formed by deformation. Preferably the conductor material is deformed. The deformation may be conducted by embossing, stamping, punching, pressing and/or squeezing.

Moreover, the retention means may be formed by cutting, milling, turning, machining and/or drilling. Even further, the retention means may be formed by the plating material. Exemplarily, the plating material may form an undercut relative to the underlying conductor material.

Moreover, the recess may be a through hole, a cut out, a groove and/or a slot. Further, the recess may be an undercut and/or an indentation. The protrusion may be welded, screwed and/or glued onto the busbar end.

The corresponding retention means may be a recess and/or a protrusion. The corresponding retention means is preferably provided at the housing body and/or at the busbar retainer and may be integrally formed with the housing body and/or at the busbar retainer, e.g., by injection molding. Further the corresponding retention means may be formed by deformation. The deformation may be conducted by embossing, stamping, punching, pressing and/or squeezing. Moreover, the corresponding retention means may be formed by cutting, milling, turning, machining and/or drilling. Furthermore, the corresponding retention means may be formed by casting and/or injection molding the housing body and/or at the busbar retainer.

The recess may be a through hole, a cut out, a groove and/or a slot. Further, the recess may be an undercut and/or an indentation. The protrusion may be welded, screwed and/or glued onto the housing body and/or the busbar retainer.

The plug connector housing may include a tip protection means. The tip protection means may avoid an unintended touching of a tip portion of the connection portion. The tip protection means may be fixedly accommodated at the housing body. Particularly, a finger contact with the tip portion may be avoided.

Alternatively, the tip protection means may be provided at the busbar portion. Preferably, the tip protection means is attached at the tip portion of the connection portion.

The plug connector housing may include a sealing portion. The sealing portion may seal a space between the housing body and the busbar portion. The sealing portion may seal an interieur space of the housing body against humidity, dust and/or other elements. Further, the sealing portion may fixate the busbar retainer and/or the tip protection means within the housing body.

The sealing portion may include a seal. The seal may be in sealed contact with the busbar portion and the housing body.

The sealing portion may further include a seal retainer and/or a sealing cap. The seal retainer may fixate the seal inside the housing body and/or on the busbar portion. The sealing cap may secure the seal and/or the seal retainer within the housing body. Further, the sealing cap may secure the tip protection means and/or the busbar retainer within the housing body.

The plug connector housing may include a mating lever that is arranged pivotable relative to the housing body between an alignment position and a mating position. In the alignment position, the mating lever allows the mating connector to be aligned with the housing body, and in the mating position the mating lever couples the housing body with the mating connector in a mated configuration. The mating lever is configured to be engageable with the mating connector, in order to move the plug connector along a mating direction relative to the mating connector into the mated configuration, when being pivoted from the alignment position to the mating position.

The plug connector housing may further include a connector position assurance member that is arranged moveable relative to the housing body so as to be moveable into a locked position. Particularly, the connector position assurance member may be supported by the housing body so as to be axially slidable. The plug connector housing may further include an elastic element. The elastic element may be integrally formed with the connector position assurance member or may be a separate element, such as a compression spring, particularly a spiral spring. The elastic element may be associated with the connector position assurance member and may be configured to urge the connector position assurance member into the locked position when the mating lever is in the mating position. In the locked position, the connector position assurance member locks the mating lever in the mating position. As the connector position assurance member locks the mating lever in the mating position, unintentionally opening the mating lever can be prevented. Thus, the mated configuration of the electrical connector assembly and the counter connector assembly is secured by the connector position assurance member.

The connector position assurance member may be integrally formed with the housing body. Further, the connector position assurance member may allow to identify whether the plug connector and the mating connector are correctly mated.

The plug connector housing may have a coupling means for being coupled to a further plug connector. Preferably, the coupling means is provided at the housing body. With this coupling means, two or more plug connectors may be connected to each other. Thus, a connector system with separated and preferably isolated phases may be obtained. Hence, the risk of a short circuit may be reduced.

Moreover, the object is at least partially achieved by a mating connector for an electrical connection system. The mating connector includes a mating connector housing and a busbar receiving portion. The busbar receiving portion is at least partially accommodated in the mating connector housing. The busbar receiving portion is configured to mate with a connection portion of a busbar end, as described above, to establish an electrical connection.

The busbar receiving portion may have a mounting end, for being mounted on a substrate. The substrate may be a battery terminal, a motor terminal, a charging socket and/or a cable. The busbar receiving portion may be configured for being mounted on a substrate by means of screwing, welding and/or crimping.

Further, the object is at least partially achieved by a system including a first electrical plug connector, being configured as described above, and a second electrical plug connector. The second electrical plug connector preferably is also an electrical plug connector as described above. The first and/or second electrical plug connector may include a plug connector housing, which has a coupling means for being coupled to a further plug connector. Hence, the first plug connector can be coupled to the second plug connector and/or vice versa by means of the coupling means. In the system, the first plug connector is coupled to the second plug connector. Preferably one of the plug connectors houses a positive phase and the other one of the plug connectors houses a corresponding negative phase. Preferably, both phases are direct current (DC) phases.

With the system separated and preferably isolated phases may be obtained. Hence, the risk of a short circuit may be reduced. Preferably one of the plug connector housings of the first plug connector or the second plug connector includes a mating lever as specified above.

Even further, the object is at least partially achieved by an electrical connection system. The system includes a plug connector as described above, and a mating connector as described above, for establishing an electrical connection to the plug connector.

Furthermore, the object is at least partially achieved by a method for assembling a busbar, particularly the busbar of an electrical vehicle. The method includes the steps of a) providing a mating connector as described above;

b) providing a busbar which includes the plug connector as described above, and c) mating the mating connector and the plug connector.

Further, the object is at least partially achieved by a busbar which includes a busbar conductor and at least two busbar ends. A busbar end is provided with an electrical plug connector as described above. Further, the busbar conductor may also be formed as described above. The busbar may include a switch and/or a branch. The busbar may be configured for being coupled to a wiring harness of a vehicle, in particular of an electric vehicle.

Further, the object is at least partially achieved by a wiring harness, in particular for an electric vehicle. The wiring harness includes a busbar as described above. The wiring harness may be used in building services, automotive industry, aircraft construction, shipbuilding and/or plant engineering.

BRIEF DESCRIPTION OF THE DRAWINGS

The present invention is now described, by way of example with reference to the accompanying drawings, in which.

DETAILED DESCRIPTION

Figure 1:
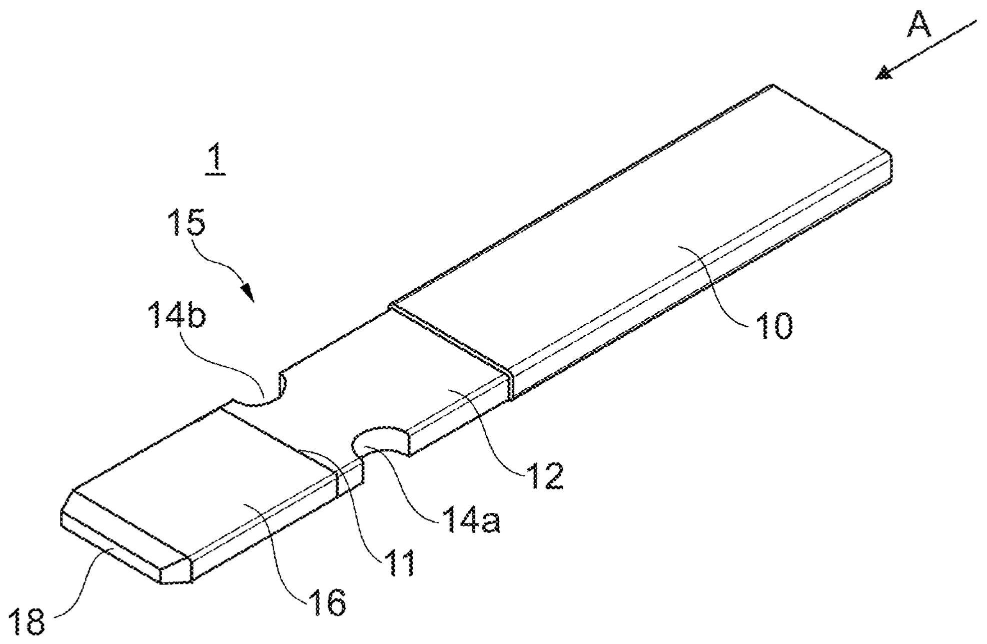
FIG. 1 is a schematic view of a busbar portion according to an embodiment of the present disclosure.

FIG. 1 is a schematic view of a busbar portion 1 according to an embodiment of the present disclosure. The busbar portion 1 includes a busbar conductor 12, and a busbar end 15 which is integrally formed with the busbar conductor 12. In the embodiment of FIG. 1, "integrally formed" means that a material of the busbar conductor 12 continuously transitions to the busbar end 15. Thus, no material boundary exists. Hence, the busbar end 15 may not be explicitly differentiated from the busbar conductor 12. Accordingly, the electric resistance is reduced. The busbar end 15 includes a rectangular cross section. Further, the busbar conductor 12 has the shape of a flat beam.

The busbar end 15, as depicted in FIG. 1, includes a connection portion 16. The connection portion 16 is configured for being plugged to a mating connector to establish an electrical connection. Moreover, the busbar end 15 further includes a plated area 11, in which a plating material is directly plated on the busbar conductor 12. Thereby, the plated area 11 partially corresponds to the connection portion 16. The plated area 11 encircles the busbar end 15.

A tip portion 18 of the connection portion 16 is not plated, as illustrated in FIG. 1. Thereby, each edge of the tip portion 18 which is perpendicular to the mating direction A is chamfered. Thus, the tip portion has a tapered shape. The chamfered edges and the tapered shape may allow that the connection portion 16 of the busbar end 15 may be easily inserted into the mating connector.

As shown by FIG. 1, the busbar end 15 further includes two retention means 14*a*, 14*b*, which are configured to engage with a corresponding retention means to receive pull forces being imposed on the busbar portion 1 in a direction opposite to a mating direction A. The two retention means 14*a*, 14*b* are recesses. The recesses 14*a*, 14*b* may have been formed by material deformation. The deformation may have been conducted by pressing and/or squeezing. Moreover, the recesses 14*a*, 14*b* may have also been formed by cutting, milling, machining and/or drilling.

Moreover, the busbar conductor 12 of the embodiment of FIG. 1 is partially surrounded by an isolation 10. Thereby, the isolation 10 is removed from the busbar end 15.

Figure 2A:
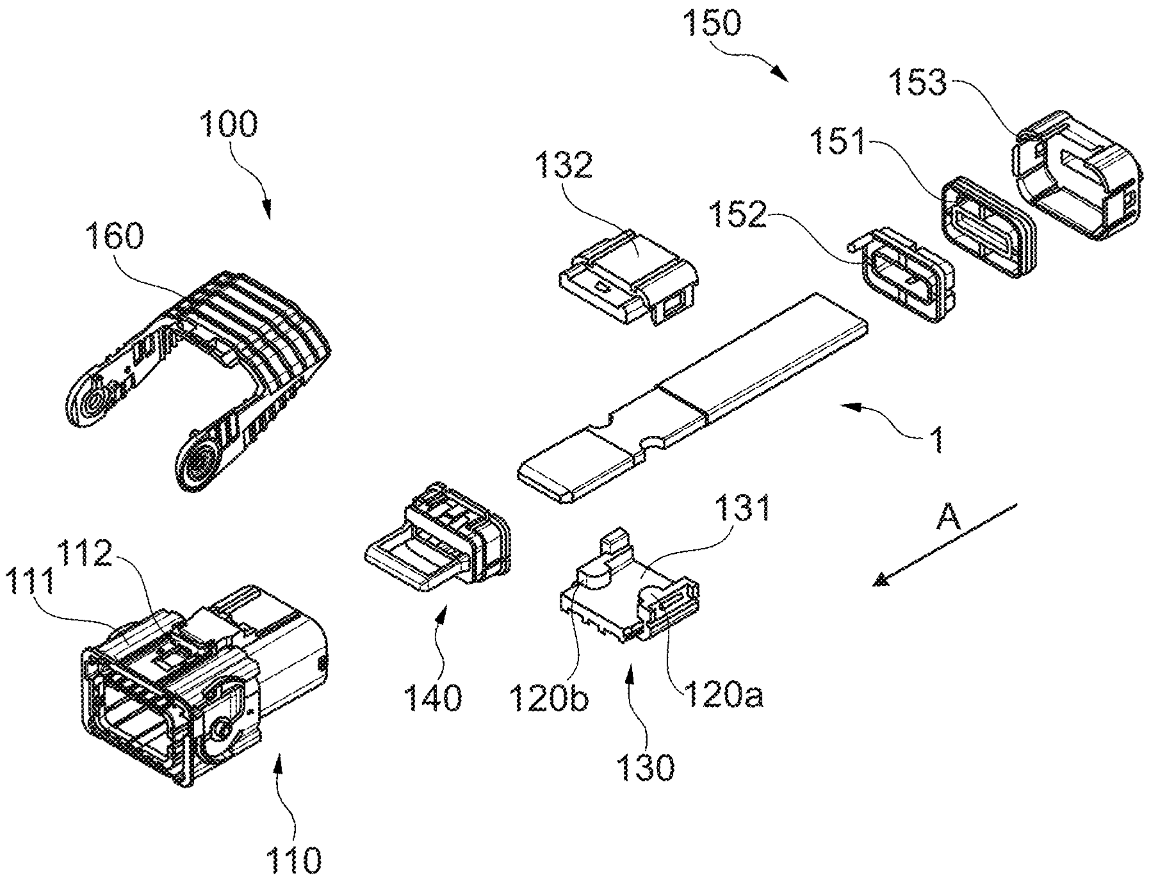
FIG. 2A is an exploded view of an exemplary electrical plug connector according to the present disclosure.

FIG. 2A is an exploded view of an exemplary electrical plug connector 100 according to an embodiment of the present disclosure. In the following the assembled state of the electrical plug connector 100 is described.

The plug connector 100 as depicted in FIG. 2A includes a plug connector housing 110. The plug connector housing includes a housing body 111. Thereby the housing body 111 defines an inner volume. The shape of the inner volume corresponds to a rectangular through hole with rounded edges.

Moreover, the plug connector 100 includes a busbar portion 1 according to the embodiment as depicted in FIG. 1. The busbar portion 1 is partially accommodated in the plug connector housing 110.

The plug connector housing 110 of FIG. 2A includes two corresponding retention means 120*a*, 120*b*, that engage with two retention means 14*a*, 14*b* of the busbar portion 1. In particular, the plug connector housing 110 includes a busbar retainer 130. The two corresponding retention means 120*a*, 120*b* are provided at the busbar retainer 130. When assembled, the busbar retainer 130 is fixedly accommodated inside the housing body 111. In the embodiment shown, the corresponding retention means 120*a*, 120*b* are integrally formed with the busbar retainer 130, particularly with part 131 of the busbar retainer 130.

Further, the busbar retainer 130 includes two parts 131, 132. These two parts 131, 132 are connected by means of a snap connection, thereby securing the busbar portion 1 within the busbar retainer 130. One part 131 of the busbar retainer 130 includes the two corresponding retention means 120*a*, 120*b*, whereas the other part 132 fixedly attaches the busbar retainer 130 to the busbar portion 1. The busbar retainer 130 retains the busbar portion 1 within the housing body 111.

The two corresponding retention means 120*a*, 120*b* are formed as protrusions. The two corresponding retention means 120*a*, 120*b* may be formed by casting and/or injection molding the part 131 of the busbar retainer 130.

The plug connector housing 110 includes a tip protection means 140. The tip protection means 140 avoids a contact with a tip portion 18 of a connection portion 16 of the busbar portion 1. Thereby the tip protection means 140 is fixedly accommodated at the housing body 111. The tip protection means 140 particularly ensures that an unintended touching, such as a finger contact with the tip portion 18 is avoided. Hence, security can be improved. Further, the tip protection means 140 prevents the tip portion 18 of a connection portion 16 of the busbar portion 1 from being damaged during assembly and mating.

The plug connector housing 110 includes a sealing portion 150. The sealing portion 150 seals a space between the housing body 111 and the busbar portion 1. In particular, the sealing portion 150 seals an interieur space of the housing body 111 against humidity, dust and/or other elements. Further, the sealing portion 150 fixates the busbar retainer 130 and the tip protection means 140 within the housing body 111.

The sealing portion 150 includes a seal 151. The seal 151 is configured to be in sealed contact with the busbar portion 1 and the housing body 111.

The sealing portion 150 further includes a seal retainer 152 and a sealing cap 153. The seal retainer 152 fixates the seal 151 inside the housing body 111 and on the busbar portion 1. Further, the sealing cap 153 secures the seal 151 and the seal retainer 152 within the housing body 111. Further, the sealing cap secures the tip protection means 140 and the busbar retainer 130 within the housing body 111. With providing the sealing portion, the plug connector 100 is suited for rough environments and prevents the electrical connection from being distorted, e.g., by moisture, dust and/or the like.

The plug connector housing 110 includes a mating lever 160 that is arranged pivotable relative to the housing body 111 between an alignment position and a mating position. The mating lever facilitates mating of the plug connector 100 with a corresponding mating connector.

Further, the plug connector housing further includes a connector position assurance member 112 that is arranged moveable relative to the housing body 111 so as to be moveable into a locked position. Particularly, the connector position assurance member 112 is supported by the housing body 111 so as to be axially slidable. In the locked position, the connector position assurance member 112 locks the mating lever 160 in the mating position. Hence, in case the mating lever 160 is in its mating position and the connector position assurance member 112 is in the locked position a proper electrical connection is established.

Figure 2B:
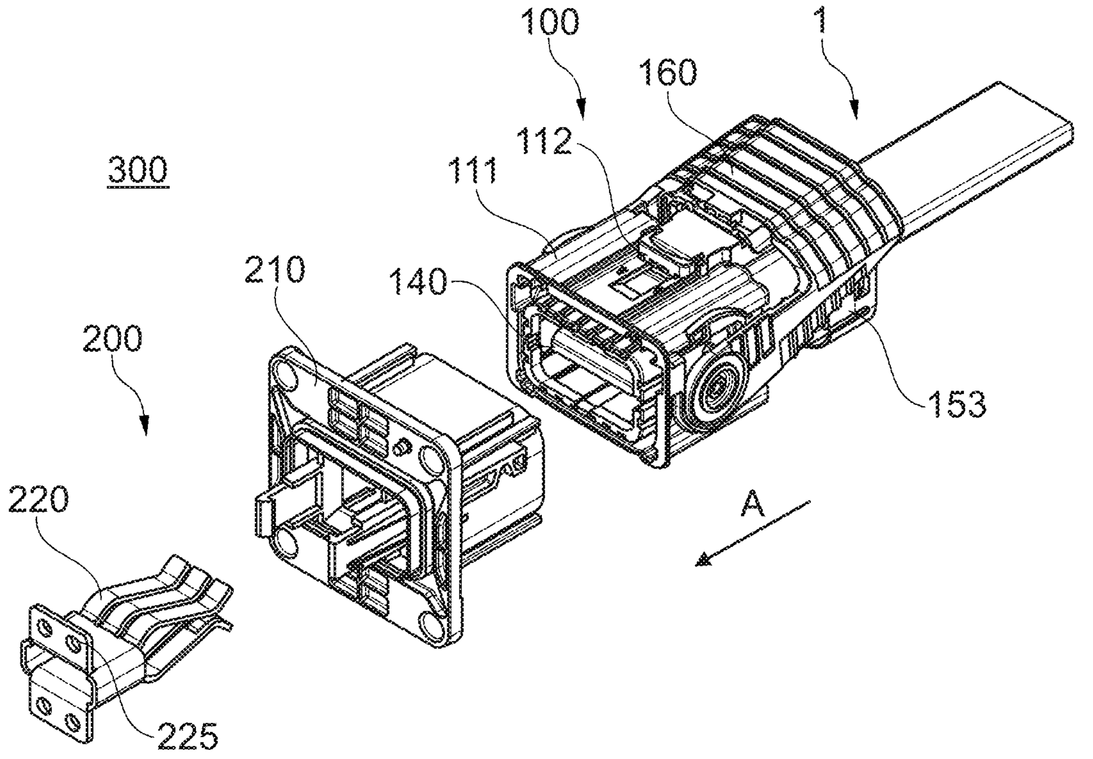
FIG. 2B is an exploded view of an exemplary electrical connection system according to the present disclosure.

FIG. 2B is a partially exploded view of an exemplary electrical connection system 300 according to an embodiment of the present disclosure. The system 300 includes a plug connector 100 and a mating connector 200 for establishing an electrical connection to the plug connector 100. In the following the assembled state of the electrical connection system 300 is described.

The plug connector 100 of the system 300 shown in FIG. 2B is depicted in FIG. 2A in an exploded view and described above.

The mating connector 200 being depicted in an exploded view in FIG. 2B includes a mating connector housing 210 and a busbar receiving portion 220. When assembled, the busbar receiving portion 220 can be at least partially accommodated in the mating connector housing 210. The busbar receiving portion 220 is configured to mate with a connection portion 16 of a busbar end 15, as described above, to establish an electrical connection. Hence, on busbar-side no terminal is required. The busbar receiving portion 220 may include multiple (at least two) contact fingers. In the depicted embodiment the busbar receiving portion 220 includes six contact fingers. Thereby each contact finger is arranged opposite to another contact finger. The stability of the electrical contact can thus be improved.

The busbar receiving portion 220 has a mounting end 225, for being mounted on a substrate. The substrate may be a battery terminal, a motor terminal, a charging socket and/or a cable. Thereby, the busbar receiving portion 220 as shown is configured for being mounted on a substrate by means of screwing. The mounting end 225 may have different configurations, such as a crimping end, a soldering end, a welding end and/or the like.

Figure 3:
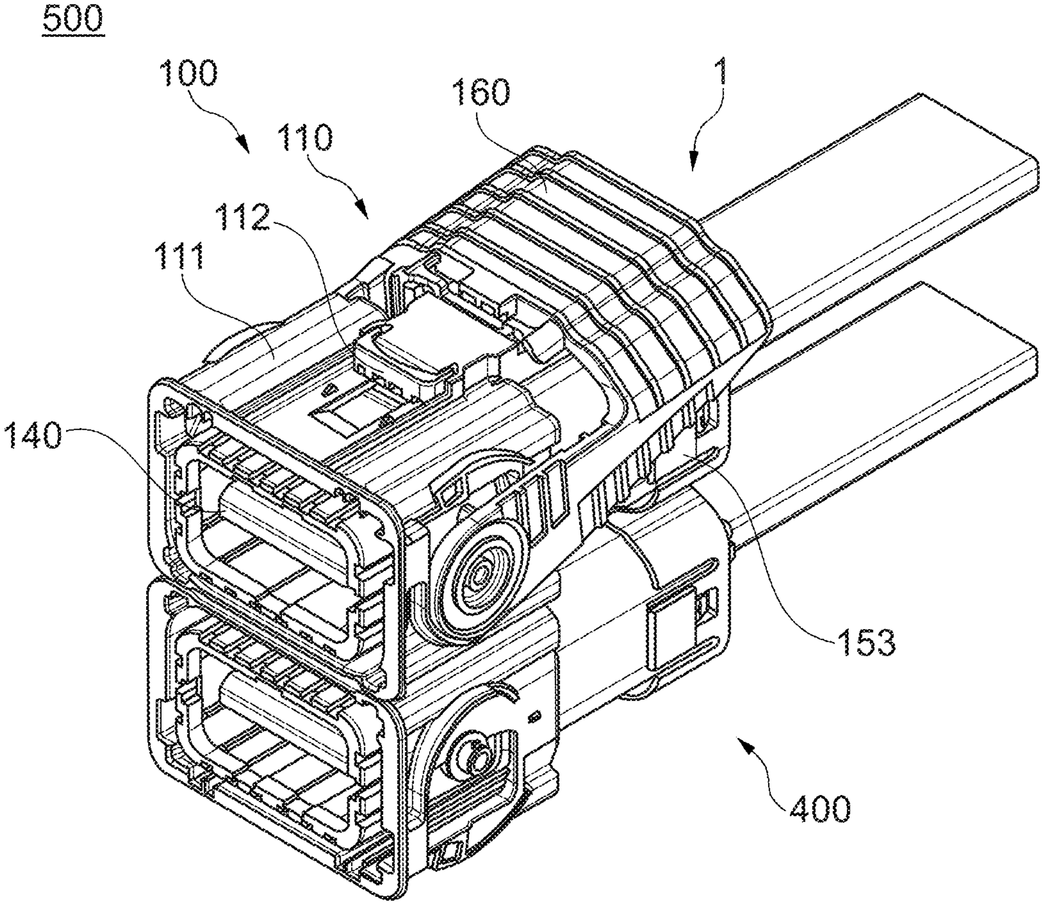
FIG. 3 is a schematic view of a system including a first electrical plug connector and a second electrical plug connector according to the present disclosure.

FIG. 3 is a schematic view of a system 500 including a first electrical plug connector 100 and a second electrical plug connector 400. The first plug connector 100 corresponds to the embodiment of FIG. 2A. The second plug connector 400 also corresponds to the embodiment of FIG. 2A but without a mating lever. The first plug connector 100 is coupled to the second plug connector 400. Preferably one of the plug connectors houses a positive phase and the other one of the plug connectors houses a corresponding negative phase. Preferably, both phases are direct current (DC) phases.

Figure 4:
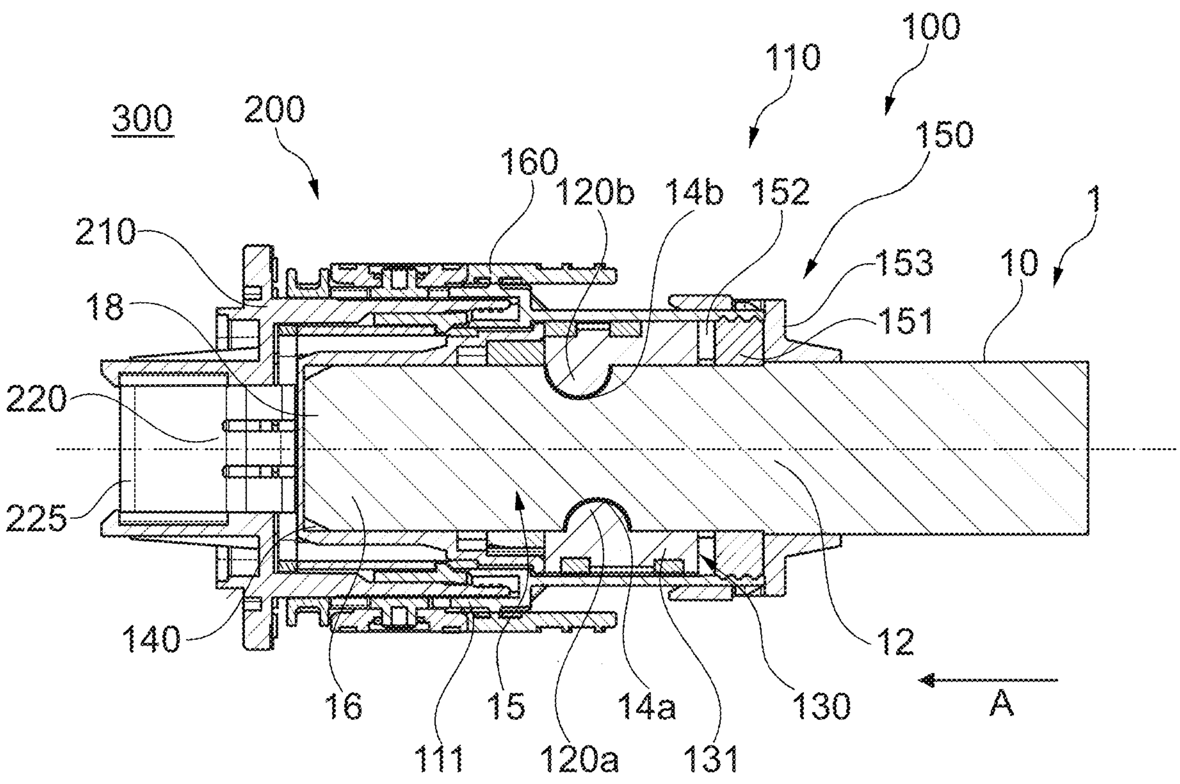
FIG. 4 is a cross-section view of an exemplary electrical connection system according to the present disclosure.

FIG. 4 is a cut view of an exemplary electrical connection system 300 according to the present disclosure. The system 300 includes a plug connector 100 and a mating connector 200 establishing an electrical connection. The plug connector 100 and the mating connector 200 are mated.

The plug connector 100 includes a plug connector housing 110 which includes a housing body 111. Moreover, the plug connector 100 includes a busbar portion 1 according to the embodiment of FIG. 1. The busbar portion 1 is partially accommodated in the plug connector housing 110.

The busbar portion 1 includes a busbar conductor 12, and a busbar end 15 which is integrally formed with the busbar conductor 12. The busbar end 15 includes a connection portion 16, the connection portion 16 being plugged to the mating connector 200 and establishing an electrical connection. The busbar end 15 further includes two retention means 14*a*, 14*b*, which engage with two corresponding retention means 120*a*, 120*b* to receive pull forces being imposed on the busbar portion 1 in a direction opposite to a mating direction A.

The plug connector housing 110 includes two corresponding retention means 120*a*, 120*b*, that engage with the two retention means 14*a*, 14*b*. In particular, the plug connector housing 110 includes a busbar retainer 130. The two corresponding retention means 120*a*, 120*b* are provided at the busbar retainer 130. Further particularly, the two corresponding retention means 120*a*, 120*b* are provided at the first part of the busbar retainer 130. The busbar retainer 130 is fixedly accommodated inside the housing body 111. The retention means 14*a*, 14*b* are formed as recesses. The two retention means 14*a*, 14*b* are relatively offset to each other in the mating direction A. Thus, a reduction of an area of a cross section perpendicular to the mating direction A of the busbar conductor 12 can be reduced. The corresponding retention means 120*a*, 120*b* are protrusions.

The plug connector housing 110 includes a tip protection means 140. The tip protection means 140 particularly serves to avoid a contact, e.g., of a finger, with a tip portion 18 of the connection portion 16 when the plug connector 100 and the mating connector 200 are not mated.

The plug connector housing 110 includes a sealing portion 150. The sealing portion 150 seals a space between the housing body 111 and the busbar portion 1. Further, the sealing portion 150 fixates the busbar retainer 130 and the tip protection means 140 within the housing body 111.

The sealing portion 150 includes a seal 151. The seal 151 is in sealed contact with the busbar portion 1 and the housing body 111.

The sealing portion 150 further includes a seal retainer 152 and a sealing cap 153. The seal retainer 152 fixates the seal 151 inside the housing body 111 and on the busbar portion 1. Further, the sealing cap 153 secures the seal 151 and the seal retainer 152 within the housing body 111. Even further, the sealing cap 153 secures the tip protection means 140 and the busbar retainer 130 within the housing body 111. The sealing cap 153 engages with the housing body 111 by means of a snap connection.

The mating connector 200 includes a mating connector housing 210 and a busbar receiving portion 220. The busbar receiving portion 220 is partially accommodated in the mating connector housing 210. The busbar receiving portion 220 is mated with a connection portion 16 of a busbar end 15 and establishes an electrical connection. The busbar receiving portion 220 has a mounting end 225, for being mounted on a substrate. The mounting end 225 includes a through hole. Thus, the mounting end 225 may be screwed on a substrate.

Figure 5:
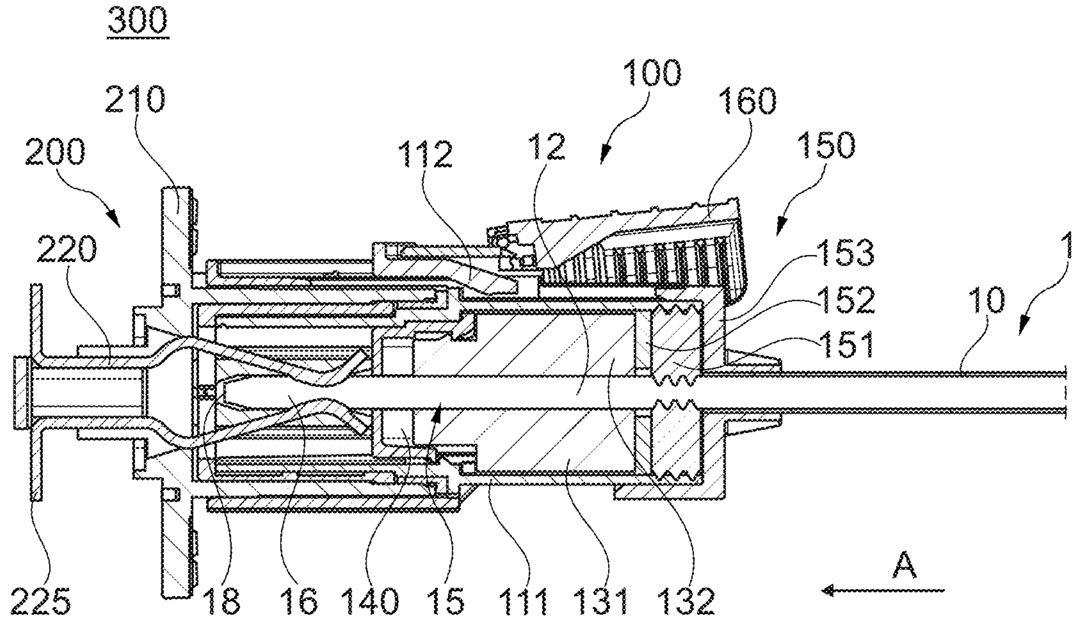
FIG. 5 is a cross-section view of an exemplary electrical connection system according to the present disclosure.

FIG. 5 is a further cut view of the exemplary electrical connection system 300 depicted in FIG. 4. As above mentioned, the system 300 includes a plug connector 100 and a mating connector 200 establishing an electrical connection. The plug connector 100 and the mating connector 200 are mated.

The plug connector 100 includes a plug connector housing 110 which includes a housing body 111. Moreover, as depicted in FIG. 4 the plug connector 100 of FIG. 5 includes a busbar portion 1 according to the embodiment of FIG. 1. Thereby the cut view of FIG. 5 is perpendicular to the cut view of FIG. 4.

As further shown in FIG. 5, the busbar receiving portion 220 of the mating connector 200 is at least partially accommodated in the mating connector housing 210. The busbar receiving portion 220 mates with a connection portion 16 of a busbar end 15 to establish an electrical connection. Particularly, the contact fingers of the busbar receiving portion, each contacts the connection portion 16 of the busbar end 15.

Figure 6:
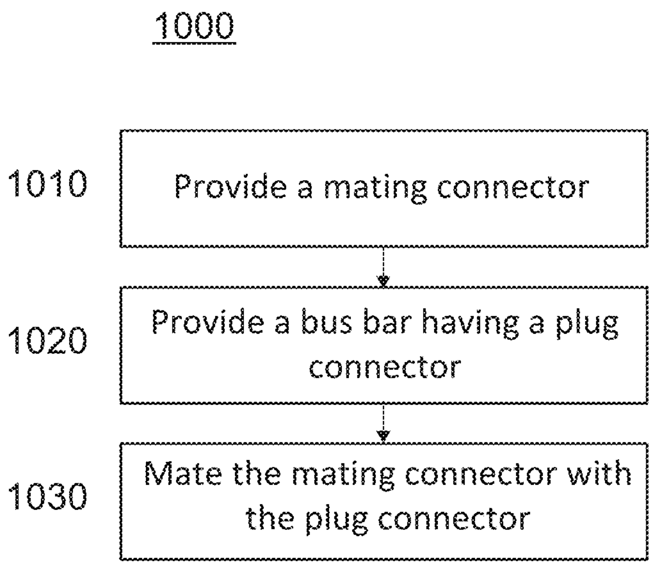
FIG. 6 illustrates a method for assembling a busbar.

FIG. 6 depicts a method 1000 for assembling a busbar. The method includes the steps of providing 1010 a mating connector 200; (b) providing 1020 a busbar which includes a plug connector 100, and (c) mating 1030 the mating connector 200 and the plug connector 100.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. An electrical plug connector for an electrical connection system, particularly for a busbar of an electrical vehicle, the electrical plug connector comprising:

a plug connector housing including a housing body; and a busbar portion, wherein the busbar portion is at least partially accommodated in the plug connector housing, wherein the busbar portion includes:

a busbar conductor, and a busbar end which is integrally formed with the busbar conductor, wherein the busbar end includes a connection portion, the connection portion being configured for being plugged to a mating connector to establish an electrical connection, wherein the busbar end further includes a retention means, which is configured to engage with a corresponding retention means to receive pull forces being imposed on the busbar portion in a direction opposite to a mating direction, and wherein the plug connector housing includes a corresponding retention means, that engages with the retention means, when the busbar portion is at least partially accommodated in the plug connector housing, wherein the plug connector housing comprises a mating lever that is arranged pivotable relative to the housing body between an alignment position and a mating position, wherein in the alignment position, the mating lever allows the mating connector to be aligned with the housing body, and in the mating position the mating lever couples the housing body with the mating connector in a mated configuration, wherein the mating lever is configured to be engageable with the mating connector, in order to move the plug connector along a mating direction relative to the mating connector into the mated configuration, when being pivoted from the alignment position to the mating position, and wherein the plug connector housing further includes a connector position assurance member that is arranged moveable relative to the housing body so as to be moveable into a locked position, thereby locking the mating lever in the mating position.

2. The plug connector according to claim 1, wherein the plug connector housing further comprises a busbar retainer, wherein the corresponding retention means is provided at the busbar retainer, and wherein the busbar retainer may be fixedly accommodated at the housing body.

3. The plug connector according to claim 2, wherein the busbar retainer comprises at least two parts.

4. The plug connector according to claim 3, wherein the two parts are further connected by means of a snap connection.

5. The plug connector according to claim 1, wherein the retention means includes a recess and/or a protrusion.

6. The plug connector according to claim 5, wherein the retention means is further formed by deformation of the busbar conductor or by machining the busbar conductor.

7. The plug connector according to claim 1, wherein the corresponding retention means includes a recess and/or a protrusion.

8. The plug connector according to claim 1, wherein the plug connector housing comprises a tip protection means, wherein the tip protection means may be configured to avoid an unintended touching of a tip portion of the connection portion, wherein the tip protection means may be fixedly accommodated at the housing body.

9. The plug connector according to claim 1, wherein the plug connector housing comprises a sealing portion, wherein the sealing portion may seal a space between the housing body and the busbar portion, and wherein the sealing portion may comprise a seal.

10. The plug connector according to claim 9, wherein the sealing portion further comprises a sealing retainer and/or a sealing cap.

11. A system, comprising:

a first electrical plug connector according to claim 1; and a second electrical plug connector according to claim 1, wherein the first plug connector is coupled to the second plug connector.

12. A busbar which comprises a busbar conductor and at least two busbar ends, wherein one of the at least two busbar ends is provided with an electrical plug connector according to claim 1.

13. A wiring harness, in particular for an electrical vehicle, wherein the wiring harness comprises a busbar according to claim 12.

14. The plug connector according to claim 1, wherein the retention means encircles the busbar conductor.

15. The system according to claim 11, wherein one of the plug connectors houses a positive electrical phase and another one of the plug connectors houses a corresponding negative electrical phase.

16. An electrical connection system, comprising:

a plug connector according to claim 1; and a mating connector for establishing an electrical connection to the plug connector.

17. A method for assembling a busbar, particularly the busbar of an electrical vehicle, comprising:

a. providing a mating connector comprising:

a mating connector housing; and a busbar receiving portion, wherein the busbar receiving portion is at least partially accommodated in the mating connector housing, wherein the busbar receiving portion is configured to mate with a connection portion of a busbar end which is integrally formed with a busbar conductor, wherein the busbar end includes a connection portion, the connection portion being configured for being plugged to the mating connector comprising the mating connector housing to establish an electrical connection, wherein the busbar end further comprises a retention means, which is configured to engage with a corresponding retention means of a plug connector housing to receive pull forces being imposed on the busbar B portion in a direction opposite to a mating direction, and wherein the plug connector housing comprises a corresponding retention means, that engages with the retention means, when the busbar portion is at least partially accommodated in the plug connector housing, wherein the plug connector housing comprises a mating lever that is arranged pivotable relative to a housing body between an alignment position and a mating position, wherein in the alignment position, the mating lever allows the mating connector to be aligned with the housing body, and in the mating position the mating lever couples the housing body with the mating connector in a mated configuration, and wherein the mating lever is configured to be engageable with the mating connector, in order to move the plug connector along a mating direction relative to the mating connector into the mated configuration, when being pivoted from the alignment position to the mating position;

b. providing a busbar which includes a plug connector, comprising:

a plug connector housing comprising a housing body, wherein the plug connector housing comprises a mating lever that is arranged pivotable relative to the housing body between an alignment position and a mating position, wherein in the alignment position, the mating lever allows the mating connector to be aligned with the housing body, and in the mating position the mating lever couples the housing body with the mating connector in a mated configuration; and a busbar portion, wherein the busbar portion is at least partially accommodated in the plug connector housing, wherein the busbar portion comprises:

a busbar conductor, and a busbar end which is integrally formed with the busbar conductor, wherein the busbar end includes a connection portion, the connection portion being configured for being plugged to a mating connector to establish an electrical connection, wherein the busbar end further comprises a retention means, which is configured to engage with a corresponding retention means of the plug connector housing to receive pull forces being imposed on the busbar portion in a direction opposite to a mating direction, and wherein the plug connector housing comprises a corresponding retention means, that engages with the retention means, when the busbar portion is at least partially accommodated in the plug connector housing, wherein the plug connector housing further includes a connector position assurance member that is arranged moveable relative to the housing body so as to be moveable into a locked position, thereby locking the mating lever in the mating position, c. mating the mating connector and the plug connector; and d. moving the connector position assurance member into the locked position.

* * * * *